United States Patent [19]

Yoon et al.

[11] Patent Number: 4,786,477
[45] Date of Patent: Nov. 22, 1988

[54] FLUIDIZED BED REACTOR WITH MICROWAVE HEATING SYSTEM FOR PREPARING HIGH-PURITY POLYCRYSTALLINE SILICON

[75] Inventors: Poong Yoon, Seoul; Yongmok Song, Chungnam, both of Rep. of Korea

[73] Assignee: Korea Research Institute of Chemical Technology, Chungnam, Rep. of Korea

[21] Appl. No.: 8,899

[22] Filed: Jan. 30, 1987

Related U.S. Application Data

[62] Division of Ser. No. 925,775, Oct. 30, 1986.

[30] Foreign Application Priority Data

Dec. 28, 1985 [KR] Rep. of Korea .................. 9938/1985

[51] Int. Cl.[4] ............................................. B01J 8/42
[52] U.S. Cl. .................................... 422/145; 118/716; 422/146; 422/199; 427/213
[58] Field of Search .............................. 422/146, 199; 219/10.55 A, 10.55 F; 118/716, 719, 724, 726; 423/349; 204/157.43, 157.45; 427/45.1, 213

[56] References Cited

U.S. PATENT DOCUMENTS

| | | | |
|---|---|---|---|
| 3,826,226 | 7/1974 | Clark | 118/716 |
| 3,963,838 | 6/1976 | Setty et al. | 427/213 |
| 4,207,360 | 6/1980 | Padovani | 427/213 |
| 4,314,128 | 2/1982 | Chitre | 219/10.55 |
| 4,416,913 | 11/1983 | Ingle et al. | 118/716 |

OTHER PUBLICATIONS

Richard Hogle, George Hsu, and Ralph Lutwack: Jet Propulsion Laboratory "Low-Cost Solar Array Project" 5101-89, pp. 4-6-4-8.

Henry F. Erk: "Chlorosilane Thermodynamic Equilibria Calculations with Applications to High Purity Silicon Preparation", pp. 30-47, Feb. 1983.

Union Carbide Corporation Report: "Flat-plate Solar Array Project" Final Report Phase III, Apr. 1979-Dec. 1981, pp. 217-227, D. J. DeLong: "Advances in Dichlorosilane Epitaxial Technology", Solid State Tech. Oct. 1972.

J. F. Franz: "Design for Fluidization" Chemical Engineering, Oct. 1, pp. 89-96 (1962).

*Primary Examiner*—Peter Kratz
*Attorney, Agent, or Firm*—Jordan and Hamburg

[57] ABSTRACT

An apparatus for preparing high-purity polycrystalline silicon is constructed with a heating applicator, a vertical fluidized bed quartz reactor within the applicator, a microwave generator, microwave guide tubes for conveying microwaves from the microwave generator to the applicator, a reacting gas inlet and outlet, a gas distribution device for distributing reacting gas within the reactor, a silicon seed inlet for introducing silicon seed into the reactor, and an outlet for withdrawing polycrystalline silicon from the reactor. The microwaves provide the heat for the fluidized bed reaction.

9 Claims, 3 Drawing Sheets

FLUIDIZED BED REACTOR WITH MICROWAVE HEATING SYSTEM FOR PREPARING HIGH-PURITY POLYCRYSTALLINE SILICON

This is a division of application Ser. No. 925,775, filed Oct. 30, 1986.

BACKGROUND OF THE INVENTION

1. Field of the Invention

The invention relates to a process and apparatus for the preparation of polycrystalline silicon and its apparatus. Particularly, the invention relates to a process and apparatus for the preparation of high-purity polycrystalline silicon deposited by thermal decomposition or hydrogen reduction of a gaseous halogenated silicon compound such as silane($SiH_4$), dichlorosilane($SiH_2Cl_2$), trichlorosilane($SiHCl_3$) and tribromosilane($SiHBr_3$) on high-purity silicon particles in a fluidized bed reactor heated by microwave.

2. Description of the Prior Art

Typical processes and apparatuses are disclosed in Siemens process where silicon is deposited by hydrogen reduction of trichlorosilane or dichlorosilane on a silicon bar heated by the electrical resistance method as described in U.S. Pat. No. 3,286,685, and the Komatsu process where silicon is deposited by thermal decomposition of silane as described in U.S. Pat. Nos. 4,148,814 and 4,150,168.

In the former, a silicon bar is heated to about 1000° to 1200° C. by resistance heating, while in the latter, it is heated to a thermal decomposition temperature of about 800° C. The reactors of both processes have the same type of quartz, or stainless steel bell jar, which has an advantage that the reactor wall is cooled below 300° C. by a coolant such as water or air so that silicon is not deposited on the inner wall, but has a disadvantage in that the polysilicon deposition rate is low, while the unit energy consumption is high because of the batch process using silicon bar which provides small surface areas for deposition.

To reduce the effects of these disadvantages, a fluidized bed process has been proposed, where silicon in the silicon-containing gas is deposited onto silicon particles while silicon particles having a large depositing area are fluidized by silicon-containing gas and carrier gas.

The fluidized bed process as mentioned above, however, generally employs an external heating method, e.g., a resistance heater as described in U.S. Pat. Nos. 3,102,861, 3,012,862, 4,207,360 and 3,963,838 and Japanese Patent Laid-Open Application (KOKAI) Nos. 59-45916, 59-45917 and 57-135708, where the temperature of the reactor is higher than that of the materials to be heated, which brings about wall deposition. This heating method normally brings about a large amount of heat loss to the environment from the system, and also, it makes it very difficult to build a large diameter reactor due to limitation of the heat supply needed for CVD(chemical vapor deposition). Particularly, thermal decomposition of silane or dichlorosilane causes silicon deposition onto the inner wall of the reactor, whereby not only is the reactor inner volume reduced but also heat conduction becomes worse, so that it is difficult or impossible to carry out further operations. Moreover, in the case of a quartz reactor, it may be cracked, when the reactor is cooled, due to different thermal expansion between the quartz reactor and deposited silicon(U.S. Pat. No. 3,963,838).

Internal installation of a heater instead of external heating in the system has been proposed as a means of reducing the effect of the disadvantages mentioned above. However, in the process using an internal installation, silicon is deposited on the heater surface, which makes it impossible to use the process for a long time, and there still remain inherent problems related to maintenance and exchange of the heater in the case of immersion of a polysilicon resistance heater in the reactor. Particularly, internal installation of a heater is limited, since the heater itself causes some problems in making good fluidization and in eliminating contamination due to direct contact with silicon particles, and also it occupies some volume of the reactor which reduces efficiency of the reactor and the effect of heating.

SUMMARY OF THE INVENTION

The inventors engaged in research in order to solve the above problems/disadvantages and concluded that a microwave direct heating process is the most effective heating method. A microwave heater has the advantage of keeping the temperature of the wall lower than that of the materials to be heated, because heat is not generated within the quartz due to transmission of microwaves through the wall. On the other hand, heat is generated within the materials to be heated by molecular friction due to polarized vibration within an electromagnetic field formed by the microwaves. Moreover, it is possible to prevent depositing silicon onto the inner wall by virtue of cooling the reactor wall to the desired temperature by coolant injection outside the reactor wall. Microwaves are utilized to heat the silicon particles within a fluidized bed reactor which provides a large heating surface. Therefore, according to the present invention, long-period operation is possible, and a large quantity of high-purity polycrystalline silicon can be continuously prepared.

BRIEF DESCRIPTION OF THE DRAWINGS

The invention is hereinafter further described with reference to the accompanying drawings, in which.

DETAILED DESCRIPTION OF THE PREFERRED EMBODIMENTS

Figure 1:
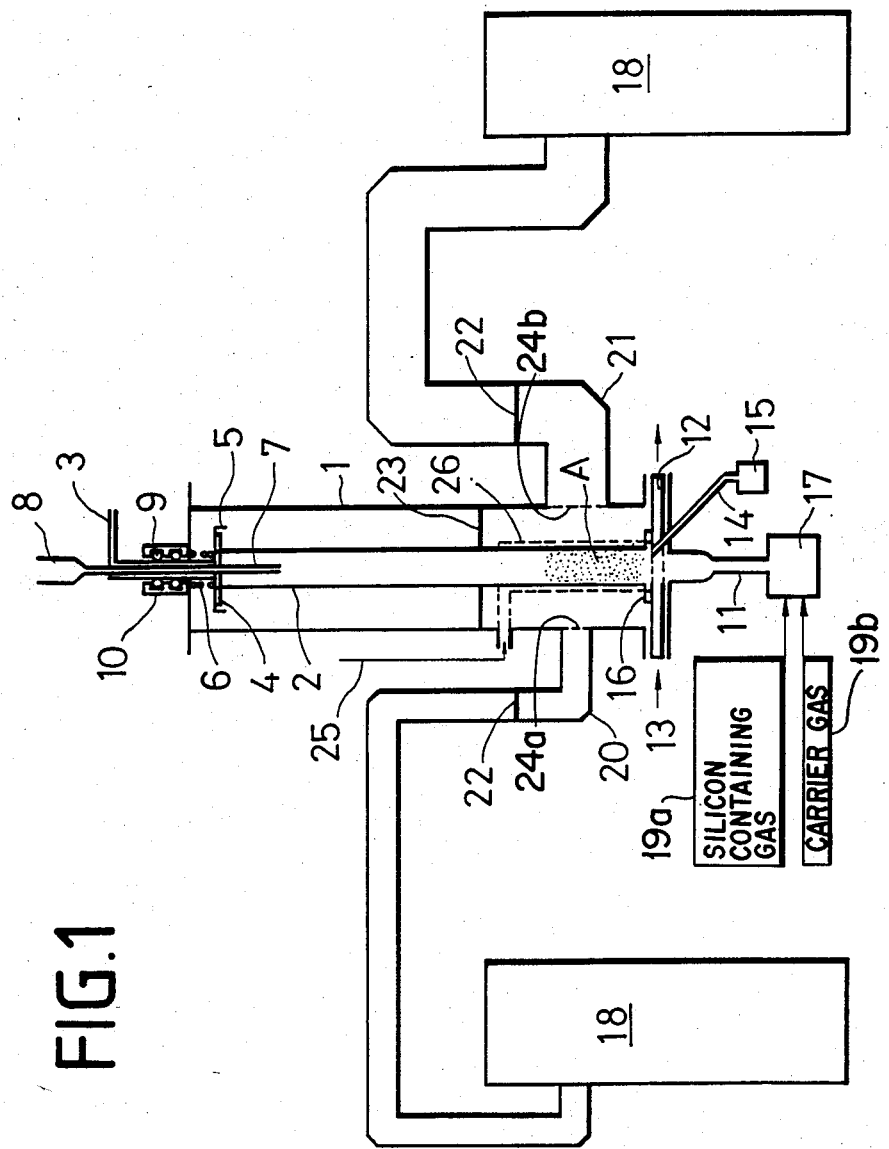
FIG. 1 illustrates an embodiment of an apparatus according to the invention.

FIG. 1 illustrates the embodiment of an apparatus for the preparation of high-purity polycrystalline silicon by the heating method for a fluidized bed reactor according to the present invention. A heating applicator 1 is made of metal such as stainless steel that resists high temperature and reflects microwaves without loss. A cylindrical quartz reactor 2 is located at the center of applicator 1. The top of quartz reactor 2 joins with a gas outlet 3 at the upper portion of applicator 1. Gas outlet 3 projects out and is installed in a non-fixed form, and a graphite gasket 4 is inserted between the joints with quartz reactor 2. Graphite gasket 4 is kept on in situ position by holder 5 located at the side of gas outlet 3, while holder 5 is subject to a resilient force in an axial direction by spring 6. Therefore, the jointed portion is kept tight by spring pressure to quartz reactor 2 through holder 5 even when the reactor moves in a small range. Seed injection tube 7 extends within gas outlet tube 3. The lower of the two ends of seed injection tube 7 is extended to an inner part of quartz reactor 2 and the other of the two ends is projected outwardly to hopper 8. Top portion of applicator 1 through which gas outlet tube 3 passes is sealed by a Teflon seal 9 and gas cut-off holder 10 to keep it gas-tight. Teflon is a trademark for tetrafluoroethylene fluorocarbon polymers.

Gas inlet tube 11 is connected to the lower portion of applicator 1, and gas distribution plate 12 is inserted between the gas inlet tube 11 and the lower portion of quartz reactor 2. Coolant path 13 is contained in gas distribution plate 12. Particle outlet tube 14 is connected into a lower portion of quartz reactor 2 and extends to a silicon collecting vessel 15. Graphite gasket 16 is installed to prevent leakage of reacting gas from the quartz reactor 2 to applicator 1.

Evaporator/preheater 17 is installed near gas inlet 11. Microwave generators 18 are installed at both sides of applicator 1. E-cornered microwave guide tube 20 and H-cornered microwave guide tube 21 from microwave generators 18 are symmetrically connected to lower side portions of applicator 1. Microwave guide tubes 20 and 21 are preferably made of aluminum rectangular tubes which give negligible loss of power in microwave transfer. They guide oscillated microwaves from a magnetron (not shown) of microwave generators 18 to applicator 1.

On the way to E-cornered microwave guide tube 20 and H-cornered microwave guide tube 21, there are more than one gas cut-off membranes 22. The gas cut-off membrane 22 serves to prevent coolant for quartz reactor wall 2 in applicator 1 from flowing into microwave generator 18, and preferably employs a plate such as quartz, pyrex or Teflon, which has good microwave transfer characteristics. Moreover, microwave shield 23 is installed at an inner middle portion of applicator 1. Microwave shield 23 is made of a metal reflecting microwaves, whereby the microwave penetration volume is limited within the material to be heated, which thereby makes the microwave penetrating density high enough to carry out good microwave heating of the material.

In the above apparatus of the present invention, silicon seed is introduced into quartz reactor 2 through seed injection tube 7 from hopper 8.

Microwave generator 8 produces microwaves which penetrate into quartz reactor 2 within applicator 1 and into silicon particles forming fluidized bed A. By the electromagnetic field formed, polarized vibrating friction takes place in the seed silicon to be heated by itself to reaction temperatures from 600° to 1200° C. Usually microwave of 915 or 2450 MHz is used.

Silicon-containing gas 19a as a reactant is injected through gas injection tube 11 with carrier gas 19b such as hydrogen after being preheated to about 300° C. in evaporator/preheater 17. Injected reactant gas disperses in quartz reactor 2 by gas distribution plate 12 to mix and fluidize bed A. Thus, fluidizing gas undertakes thermal decomposition or hydrogen reduction by contacting hot silicon seed and deposits on the seed surface by chemical vapor deposition. Seed particles thus become larger. Adequately large particles pass through particle outlet tube 14 and are collected in polysilicon collecting vessel 15.

In the aforementioned process, silicon particles are produced continuously because silicon seed and reacting gas are supplied continuously. Moreover, by-product gas or non-reacted gas in the above reaction can be recovered and used again by gas outlet tube 3 and recovery apparatus (not shown).

As the reaction proceeds, gas distribution plate 12 is heated by heat transfer from hot silicon particles, and silicon particles in fluidized bed A are not normally fluidized after a long period of reaction, because silicon is deposited on the surface of distribution plate 12 by reacting gas passing through the plate.

These problems can be removed by cooling gas dispersion plate 12 below 400° C. with circulating coolant such as water or nitrogen, as shown in FIG. 1. The same problems as above can take place in the quartz reactor wall. Thus, deposited silicon on the inner wall forces the inner volume to be reduced. Therefore, the temperature of the inner wall of quartz reactor 2 should be cooled below the reaction temperature of silicon-containing gas by circulating coolant in cooling path 25 formed between the inner wall of applicator 1 and the outer wall of quartz reactor 2 to prevent these problems. Moreover, quartz reactor 2 can contain separate cooling path 26 between double tubes.

When silicon seed is heated by microwaves in the quartz reactor 2, the reactor is expanded thermally by heat transfer. But applicator 1 is not thermally expanded, and therefore quartz reactor 2 may crack. According to the present invention, the spring 6 supporting the holder 5 of gas outlet tube 3 is pressed, ad prevents any damage incurred by thermal expansion when the quartz reactor 2 expands.

Figure 2:
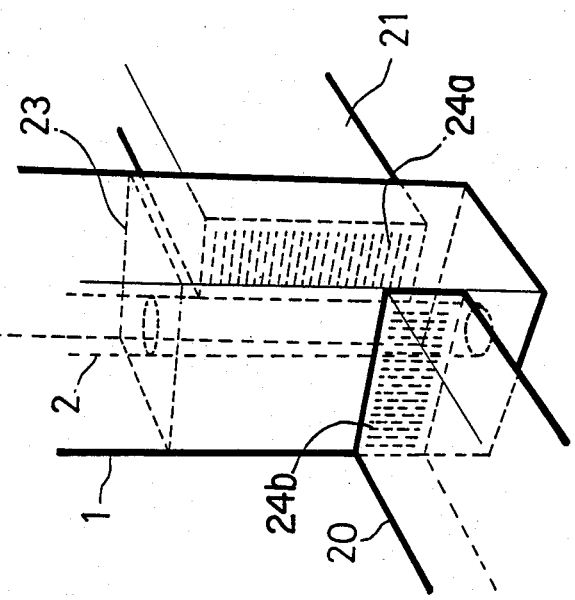
FIG. 2 illustrates important parts of FIG. 1.

FIG. 2 illustrates a construction related to E-cornered microwave guide tube 20 and H-cornered microwave guide tube 21. Both E-cornered and H-cornered microwave guide tubes 20 and 21 have a rectangular shape and face each other in different orientations, as shown in FIG. 2. Microwave orientations 24a and 24b introduced from the microwave generators to applicator 1 cross each other in the opposite direction so that the microwaves coming from two opposite directions do not interfere. Moreover, E-cornered and H-cornered microwave guide tubes are installed to face each other so that the size of the microwave generators can be reduced and energy consumption can also be decreased.

In the aforementioned embodiment of the present system, it is necessary to install at least one pair of microwave generators to form uniform heating. If microwaves are introduced from the upper side of applicator 1, one microwave generator may suffice.

Figure 3:
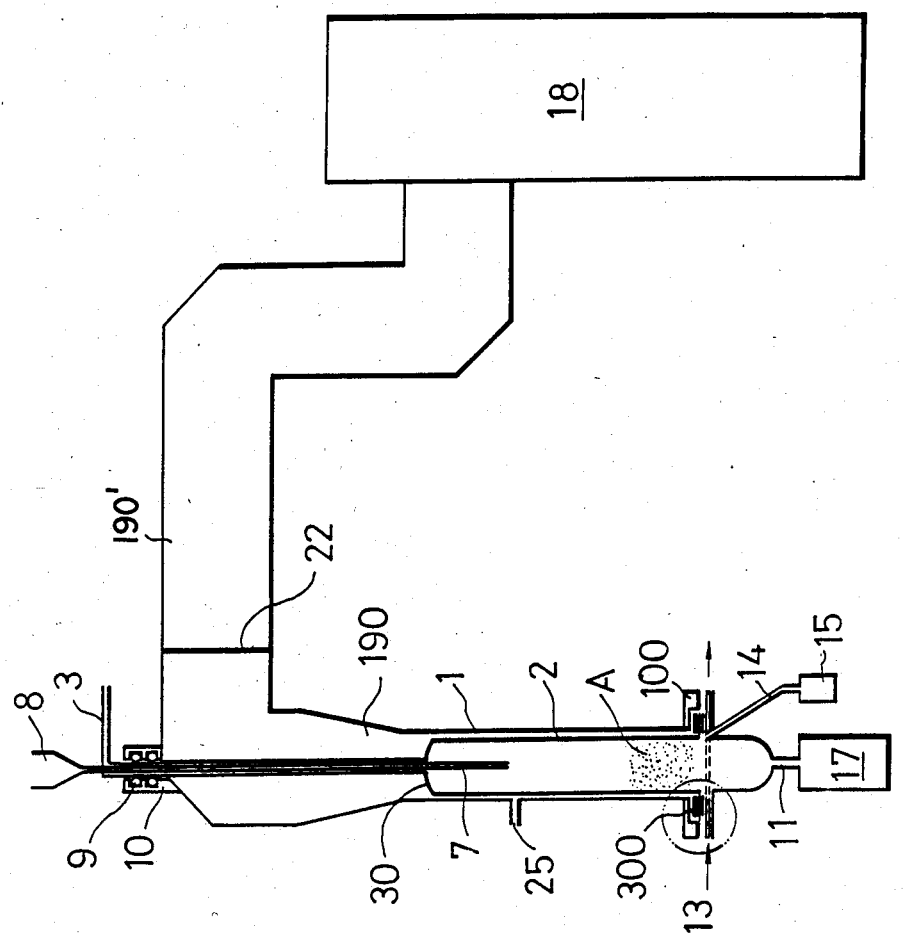
FIG. 3 illustrates another embodiment of an apparatus according to the invention.
Figure 4:
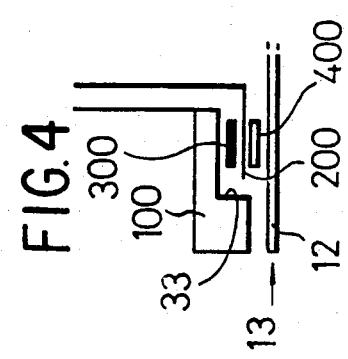
FIG. 4 illustrates the portion of the FIG. 3 embodiment encircled by a dotted line.

FIGS. 3 and 4 illustrate another embodiment of the above apparatus which can transmit microwaves from the upper side of applicator 1. The same numerals as used in FIG. 1 are applied to the identical parts in this embodiment as those of the aforementioned embodiments.

Microwave guide tube 190' is jointed to the top of applicator 1. The cross section of the tube 190' is usually in the shape of a rectangle or circle. If a circular tube is used, joining tube 190 is used to connect to applicator 1. Gas outlet tube 3 and the seed injection tube 7 pass through microwave guide tube 190', and are connected to quartz reactor 2.

Particularly, the upper portion of quartz reactor 2 is directly connected to gas outlet tube 3, and the lower part has a gas seal that prevents reacting gas from leaking into applicator 1. That is, as seen especially well in FIG. 4, O-ring graphite gasket 300 is inserted between flange 100 at the lower portion of applicator 1 and flange 200 of quartz reactor 2, and another graphite gasket 400 is inserted between flange 200 and gas distribution plate 12 to keep it completely gas-tight.

The above embodiment requires only one microwave heating apparatus 18 so as to obtain the merits of saving installation, maintenance, and energy costs.

According to the above embodiment of the invention, a high-purity silicon reactor can be used instead of quartz reactor 2. However, in this case, quartz material or any other material through which microwaves can penetrate must be used at the upper side 30 of the reactor.

Processes for the preparation of high-purity polycrystalline silicon, according to the present invention are exemplified below.

EXAMPLE 1

A quartz reactor of 48 mm ID, 2.5 mm thickness and 1000 mm height was installed inside the applicator of FIG. 1. Microwave as a heating source was introduced through the quartz reactor wall into the fluidized bed containing silicon particles of 60/100 mesh and the temperature of the fluidized bed kept at above 700° C. by polarized vibrating friction of silicon molecules.

On the other hand, reacting gas comprising 20 mole % of silane and 80 mole % of hydrogen was supplied to the fluidized bed at the rate of 13.3 l/min at room temperature through a distribution plate cooled by water after being preheated to 300° C. in a preheater. The quartz reactor tube wall was cooled by flowing nitrogen gas into the applicator. Deposited polysilicon granules flowed out through the outlet tube by which the height of the fluidized bed wa kept at about 150 mm.

Polycrystalline silicon at the average rate of 162.5 g/hr was obtained over a 10 hour operation. Silicon deposition on the quartz reactor wall was not found.

EXAMPLE 2

Example 1 was repeated except that reacting gas comprising 10 mole % of silane and 90 mole % hydrogen was directly supplied to the fluidized bed at the rate of 13.9 l/min at room temperature, not through a preheater. Polycrystalline silicon at an average rate of 82.8 g/hr was obtained over a 10 hour operation.

EXAMPLE 3

Using the same apparatus as in Example 1, a fluidized bed containing a silicon particle size of 40/60 mesh was kept at 150 mm high, and reacting gas containing a mixture of 22 mole % of silane and 78 mole % of hydrogen was supplied to the fluidized bed at 36.4 l/min and at the room temperature after being preheated at 300° C. through the preheater.

Polycrystalline silicon at the average of 268.1 g/hr was obtained over a 10 hour operation.

EXAMPLE 4

This example was carried out in the same apparatus as used in Example 1, and the height of the fluidized bed having a silicon particle size of 40/60 mesh was about 150 mm. Reaction gas containing 10 mole % of silane and 90 mole % of hydrogen was supplied to the fluidized bed at 11.5 l/min without passing through the preheater.

Polycrystalline silicon at an average 63 g/hr was obtained over a 20 hour operation.

EXAMPLE 5

A quartz reactor of 98 mm ID, 3 mm thickness and 1500 mm height was installed in the cylindrical microwave guide tube applicator of FIG. 3 and microwaves as a heating source supplied from the upper portion of the fluidized bed.

2400 g of silicon having a particle diameter of 60/100 mesh was charged to the quartz reactor through the seed injection tube to be fluidized, and the temperature of the bed kept at 670° C. Reacting gas comprising 10 mole % of silane and 90 mole % of hydrogen was supplied into the fluidized bed at the rate of 22.8 l/min at room temperature through the preheater. The quartz reactor wall was cooled by nitrogen. Polycrystalline silicon of 151 g was obtained after a 1 hour operation, and no deposition of silicon was found on the inner wall of the quartz reactor.

EXAMPLE 6

A fluidized bed was charged with 3200 g of silicon having a particle diameter of 60/100 mesh, as used in Example 5, and the temperature of the fluidized bed kept at 700° C. Reacting gas comprising 20 mole % of silane and 80 mole % of hydrogen was supplied into the fluidized bed at the rate of 31.9 l/min at room temperature via the preheater. There was no cooling of the quartz reactor wall by cooling gas. Polycrystalline silicon of 335 g was obtained after a 1 hour operation, and a little silicon deposited onto the wall of quartz reactor was observed.

EXAMPLE 7

3200 g of silicon having a particle diameter of 40/60 mesh was introduced into the same reactor as used in Example 5, and the temperature of the fluidized bed kept at 700° C. Reacting gas comprising 10 mole % of silane and 90 mole % of hydrogen was supplied into the fluidized bed at the rate of 42.4 l/min at room temperature after being preheated to 350° C. in the preheater. At the same time, the quartz reactor wall was cooled by nitrogen gas. 270 g of polycrystalline silicon was obtained after a 1 hour operation, yet no trace of deposited silicon on the inner wall of the quartz reactor was found.

The scope of the present invention includes not only the embodiments of the illustrated drawings, examples, and detailed description of the invention, but also all embodiments related directly or indirectly thereto.

What is claimed is:

1. An apparatus for the preparation of high-purity polycrystalline silicon, comprising applicator means, an elongated reactor means installed within said applicator means with the longitudinal axis of the reactor means being vertically disposed, said reactor means having an upper portion a microwave shield disposed between said upper and lower portions of said reactor means, and a lower portion, feeding means at the upper portion of said reactor means for introducing silicon seed into said reactor means, gas inlet means connected to the lower portion of said reactor means for introducing a silicon-reacting gas into said reactor means, gas outlet means in the upper portion of said reactor means a joint-seal means between said gas outlet means and said applicator means, said joint-seal means comprising a spring means and a gasket which is biased by said spring means, gas distributor means at the lower portion of said reactor means connected to said gas inlet means and distributing said gas into said reactor means so as to form a fluidized bed of said silicon particles in the lower portion of said reactor means above said gas distributor means as the gas flows through the reactor to said gas outlet means, a a microwave generator, at least two microwave guide tubes connecting said microwave generator to said applicator means at a position opposite said lower portion of said reactor means to thereby introduce microwave energy on opposite sides of said reactor means to thereby introduce microwaves into opposite sides said reactor means to said lower portion of said reactor means to effect disposition of silicon from the silicon reacting gas into said silicon seed in the fluidized bed to thereby form high-purity polycrystalline particles gas cut-off membrane means in said microwave guide tubes, and cooling means for cooling said gas distributing means to maintain said gas distribution means at a temperature to prevent substantial deposition of silicon on said gas distribution means.

2. An apparatus as in claim 1, wherein, one of said microwave guide tubes being connected to said applicator means so as to introduce microwaves into said reactor means in a direction that does not interfere with microwaves being introduced into said reactor means by the other microwave guide tube.

3. An apparatus as in claim 1, wherein said microwave guide tubes have a generally rectangular cross-sectional configuration.

4. An apparatus as in claim 1, wherein said applicator means has an inner wall and said reactor means has an outer wall spaced from said inner wall, and further comprising further cooling means in said space between said inner wall and said outer wall to cool said reactor to prevent deposit of silicon on the inner wall of said reactor means.

5. An apparatus as in claim 4, wherein said further cooling means comprises a quartz double tube disposed along the outer wall of said reactor means.

6. An apparatus as in claim 1, wherein said applicator means comprises an elongated applicator vessel having its longitudinal axis vertically disposed, said reactor means comprising an elongated reactor vessel having its longitudinal axis vertically disposed, said reactor vessel being disposed in said applicator vessel with the longitudinal axes of said applicator vessel and said reactor vessel being coincident, said reactor vessel having an outer wall, said applicator vessel having an inner wall spaced from said reactor vessel outer wall.

7. An apparatus as in claim 6, wherein said applicator vessel has a lower portion juxtaposed to said lower portion of said reactor means, said microwave guide tubes being connected to said lower portion of said applicator vessel.

8. An apparatus as in claim 6, wherein said reactor vessel is made at leaast partially of quartz and said applicator vessel is made at least partially of metal.

9. An apparatus as in claim 1, wherein said gas inlet means comprises evaporator/preheater means.

* * * * *